(12) United States Patent
Edge

(10) Patent No.: US 8,203,712 B2
(45) Date of Patent: Jun. 19, 2012

(54) METHOD AND APPARATUS FOR MEASURING COLORS

(75) Inventor: Christopher J. Edge, St. Paul, MN (US)

(73) Assignee: Eastman Kodak Company, Rochester, NY (US)

(*) Notice: Subject to any disclaimer, the term of this patent is extended or adjusted under 35 U.S.C. 154(b) by 448 days.

(21) Appl. No.: 12/533,424

(22) Filed: Jul. 31, 2009

(65) Prior Publication Data
US 2011/0026028 A1 Feb. 3, 2011

(51) Int. Cl.
*G01N 21/25* (2006.01)
(52) U.S. Cl. ......................... 356/405; 356/416
(58) Field of Classification Search ............... 356/405
See application file for complete search history.

(56) References Cited

U.S. PATENT DOCUMENTS

| | | | |
|---|---|---|---|
| 5,596,428 | A | 1/1997 | Tytgat |
| 5,754,448 | A | 5/1998 | Edge |
| 6,137,540 | A | 10/2000 | Desprez-LeGoarant |
| 7,554,705 | B2 | 6/2009 | Edge |
| 2009/0147328 | A1 | 6/2009 | Edge |
| 2009/0153888 | A1 | 6/2009 | Edge |

OTHER PUBLICATIONS

Wyscecki; Color Science: Concepts and Methods, Section 5.6.6, pp. 379-392, no. date.
William A. Thornton; Toward a More Accurate and Extensible Colorimetry. Part VI. Improved Weighting Functions. Preliminary Results; Color research and application, pp. 226-233, 1998.
Amy D. North and Mark D. Fairchild; Measuring Color-Matching Functions. Part II. New Data for Assessing Observer Metamerism; vol. 18, No. 3, pp. 163-170, Jun. 1993.
Mark D. Fairchild; A Novel Method for the Determination of Color Matching Functions; Color research and application, 1989, pp. 122-130.
CIE15:2004, Appendix B.
Robert Hunt; The Reproduction of Colour; pp. 138-141 and pp. 706-707, no date.
W.S. Stiles and J.M. Burch; N.P.L. colour-matching investigation: Final Report (1958), National Physical Laboratory; pp. 1-26.

*Primary Examiner* — Layla Lauchman
(74) *Attorney, Agent, or Firm* — Nelson Adrian Blish

(57) ABSTRACT

A color measurement device includes an aperture for obtaining light from a color sample to be measured; a plurality of sets of color filters associated with human observer functions at different regions of color space; at least one detector for measuring the intensity of filtered light; an analog to digital converter for converting voltage signals from the at least one detector to digital values representative of tristimulus values associated with each of the sets of color filters; and a processor to combine the sets of tristimulus values in order to calculate a final set of tristimulus values, the combining being a function of at least one of the sets of tristimulus values.

6 Claims, 7 Drawing Sheets

METHOD AND APPARATUS FOR MEASURING COLORS

CROSS REFERENCE TO RELATED APPLICATIONS

Reference is made to commonly-assigned U.S. patent application Ser. No. 12/533,313 (now U.S. Publication No. 2011/0026027), filed Jul. 31, 2009, entitled A METHOD FOR CONVERTING DIGITAL COLOR IMAGES, by Christopher Edge; U.S. patent application Ser. No. 12/533,332 (now U.S. Publication No. 2011/0026817), filed Jul. 31, 2009, entitled METHOD FOR MATCHING COLORS, by Christopher Edge; U.S. patent application Ser. No. 12/533,367 (now U.S. Publication No. 2011/0026052), filed Jul. 31, 2009, entitled METHOD FOR CHARACTERIZING THE COLOR RESPONSE OF AN IMAGING DEVICE, by Christopher Edge; U.S. patent application Ser. No. 12/533,400 (now U.S. Publication No. 2011/0025703), filed Jul. 31, 2009, entitled METHOD FOR REPRODUCING AN IMAGE ON AN IMAGING DEVICE, by Christopher Edge; and U.S. patent application Ser. No. 12/533,451 (now U.S. Publication No. 2011/0026821), filed Jul. 31, 2009, entitled METHOD FOR MATCHING COLORS BETWEEN TWO SYSTEMS, by Christopher Edge; the disclosures of which are incorporated herein.

FIELD OF THE INVENTION

The present invention relates to the field of color metrology as applied to color management. In particular, it relates to adjusting human observer functions in terms of the location in color space.

BACKGROUND OF THE INVENTION

Human observer functions $\bar{x}(\lambda)\bar{y}(\lambda)\bar{z}(\lambda)$ are response functions used to characterize colors perceived by the human eye. The existing Commission Internationale de l'Éclairage (CIE) and International Organization for Standardization (ISO) definitions of the human observer functions are the basis for color management systems and for standard profile formats such as those defined by the International Color Consortium (ICC). The fact that the ICC has been embraced and incorporated into operating systems such as Apples™ OS X and applications such as Adobe™ PhotoShop™ is evidence that the standard is reasonably useful and effective for ensuring or at least improving the quality of color appearance of images. The paradigm of conversions from "source" to "destination" implies preserving quality and/or appearance of digital color images.

Standards committees such as IDEAlliance have defined very clear measured color target values and tolerances using (CIEXYZ) and (CIELAB) in order to ensure that the visual appearance of hard copy proofing systems from multiple venders are consistent for a given digital input image file. Assessments of prints generated by multiple venders using these standards have been performed on numerous occasions with great success both within committee meetings and at public events to showcase the efficacy of these standards. In most cases, venders make use of the ICC standard or similar colorimetrically-based formats in order to ensure correct output of printed images.

Although existing CIE and ISO standards appear to work well for multiple prints viewed under the same illumination, achieving the same level of standardization for soft proofing has proven to be more challenging. An example of this reality is the fact that the calculations for CIELAB in the IDEAlliance certification of soft proofing systems are normalized to the white point of the display rather than to D50. The reason for this non-standard calculation of CIELAB is the widespread practice of adjusting the white point of a display in order to match visually the white balance of the D50 illumination used to view the corresponding print. In theory, it should be adequate to measure the white balance of the illumination and merely ensure that white point of the display is adjusted to match the illumination according to measured values.

In reality, an offset to the measured white is often applied in order to ensure a good visual match between display and print. However, it has been observed that it is difficult to ensure both accurate appearance of white/gray balance and accurate appearance of other critical regions of color such as skin tones. If there exists an error in the standard, one would expect a simple correction would be sufficient.

The need for a slight modification or offset to the white point appears to have some validity as indicated by scientific studies that have been performed in the area of color matching functions determined via the "Maxwell method," i.e. the matching of whites, vs. the more common "saturation method," which determines color matching functions based on matching saturated colors. For example, in section 5.6.6 of Color Science: Concepts and Methods, Wysecki summarizes the work done in the area of comparing the saturation and Maxwell methods. At the end of the section, Wysecki states, "The deviations are appropriately termed failure of the additivity law of color matching in a bipartite field. Suggestions have been made with regard to possible causes of these failures. They include chromatic adaptation (Crawford, 1965), Maxwell spot (Palmer, 1980), and interactions or linkages between different cone mechanisms (Ingling and Drum, 1973), but further work is obviously needed to resolve the conundrum."

Likewise, in a series of papers I-VI entitled "Toward a more accurate and extensible colorimetry," Thornton describes various experiments involving the matching of whites. Converting his data to units of CIELAB indicate a disagreement between observed matches of different white spectra and predicted matches of up to 25 ΔE as calculated using the standard human observer. In a similar study published in 1993 by North and Fairchild, "Measuring Color-Matching Functions. Part II" (1993, North and Fairchild) Thornton's observations appeared to be confirmed, although the analysis of the results was performed based on the model of the deviate human observer, i.e. was explained by the differences between individual observers rather than interpreted to imply a correction to existing standard human observers functions.

Most recently at the Society for Imaging Science and Technology (IS&T) Color Imaging Conference 16 in Portland, Oreg., a presentation, "Color Vision and More Comprehensive Color Appearance Models" was given by Hirohisa Yaguchi, Chiba University (Japan). In this presentation, Yaguchi-san showed plots of color matching functions obtained using his own eyes on his color matching apparatus using first the saturation and then the Maxwell method. He pointed out that the plots contained differences that were not insignificant, although no further explanation was given.

Virtual proofing systems are required to display an accurate match between display and hard copy with little effort from the user. If one accounts for metamerism and for errors in conventional XYZ calculations, one finds that the overall hues and white balance are reasonable. For critical color requirements, however, there can exist unacceptable visual differences between display and hard copy in skin tones (for example) that equate to several percentage points of change in magenta dot gain. Although this error is small, it is enough to be problematic for critical work.

Therefore there remains a need for an improvement to conventional XYZ calculations. It is noted that the "deviant observer" described by Fairchild does vary or modify the $\bar{x}(\lambda)$ $\bar{y}(\lambda)\bar{z}(\lambda)$ functions with size of the color observed (characterized as an angle indicating the size of the cone of viewing from the eye to a circle indicating the region of the color being observed), yellowing of the lens of the eye due to age, effect of the macula of the eye, etc. These adjustments endeavor to account for differences due to size of color and to account for observer to observer differences. However, the particular observer functions for a given size of color and particular individual is the same regardless of the spectral power distribution (SPD) $S(\lambda)$ of the color stimulus being observed. Reference is made to such observer functions as "static" meaning they do not change with SPD $S(\lambda)$. By contrast, reference is made to human observer functions that change or adapt depending on the SPD $S(\lambda)$ of the particular color being viewed as "non-static" meaning that they do vary with $S(\lambda)$.

If the human observer functions were static with $S(\lambda)$, pairs of colors would always match as long as the calculated values of XYZ were nearly the same, regardless of whether the colors were very saturated or very neutral. However, if the human observer functions are not static with $S(\lambda)$, it is quite possible for saturated color pairs to match but for neutral pairs of colors to appear different even though their XYZ's were the same. By allowing the observer functions to be non-static with $S(\lambda)$, discrepancies between saturated and neutral regions of color can be resolved, thereby ensuring that pairs of color will always match when their XYZ's are similar regardless of their $S(\lambda)$ characteristics.

The observer functions are the basis for color management systems. A review how color management systems work in relation to the XYZ values calculated using the observer functions, and L*a*b* values derived in turn from XYZ is necessary, with the understanding that any improvements or changes to the observer functions will correspondingly affect XYZ, L*a*b*, and the functionality and efficacy of color management systems that rely on these color values.

Current color management systems such as Apple ColorSync™ convert color pixel data from source device dependent coordinates to destination device dependent coordinates via a device independent color space referred to as the Profile Connecting Space or PCS. The PCS is generally based upon tristimulus values CIEXYZ or perceptually more uniform color spaces such as CIELAB which are calculated from CIEXYZ.

The general procedure is to define source colors either as a list of PCS values (such as the Pantone™ library) or as a set of device pixel values such as CMYK with an associated profile or characterization. The most common format for such profiles is that of the International Color Consortium (ICC). In the latter case, the processing engine of the system known as the color matching module or method (CMM) converts the device dependent values (e.g. CMYK) to an appropriate PCS (e.g. CIELAB or CIEXYZ) via interpolation of tables within the ICC profile for the device.

In order for these PCS values to demonstrate usefulness, the color management system is usually invoked for the purpose of converting these PCS values (once they are fetched or calculated) to a device dependent destination such as an RGB monitor or digital projector. This is performed via the color matching method (CMM) in conjunction with the ICC profile of the destination device. Implicit in the above system is the assumption that at some point prior to the above conversion, color measurements have been performed in order to calculate the PCS values. For individual colors in a library such as Pantone™, this is the only effort that is required. In the case of a complex device requiring an ICC profile, multiple color measurements are performed and high resolution look up tables are calculated from that data in order to construct a reasonable approximation to the color characteristics of the device, for example, to estimate reasonable expected measured values of L*a*b* or XYZ for any combination of CMYK pixel values. Likewise, for complex devices, an inverse table is constructed and stored in the ICC profile to convert PCS values to the devices codes of the device, e.g. RGB or CMYK.

All the above requires a means for measuring and quantifying color. The two most common methods are spectral measurement and colorimetric measurement. Spectral measurement results in spectral data, either in the form of a reflectance spectrum $R(\lambda)$ or the spectral power distribution (SPD) $S(\lambda)$. The former is used for reflective materials while the latter is used for an emissive device such as a monitor. Since the SPD is required to calculate XYZ using the observer functions, the SPD for reflective materials is usually calculated by multiplying $R(\lambda)$ by the SPD of the illuminant $I(\lambda)$.

The present invention modifies the behavior of the human observer functions as they vary with $\lambda$ based on changes of location in color space of the color being measured. In particular, colors in the region of white and gray will require somewhat different observer functions from colors that are saturated. These modifications to the calculation of XYZ from $S(\lambda)$ will affect the characterizations and the conversions of colors processed by a color management system. In particular, the physical outcome of this invention will be that images reproduced on a display or digital projector using a color management system will measure differently from the current systems particularly in regions of neutral and white.

Furthermore, for systems comprising extremely narrow band primaries, such as a projector using RGB lasers, there will be a significant improvement in the color reproduction of original color images. For example if the original image is displayed on a monitor, converted with the color management system, and displayed using a projector with RGB lasers, the visual match between the two images will be significantly improved particularly in regions of white and gray if the color management system is modified to use the improved human observer functions.

SUMMARY OF THE INVENTION

The present invention describes a color processing system that utilizes an improved method of defining the human observer functions. The new colorimetric definition is based on human observer functions that are not static, as in the prior art, but rather vary as a function of $S(\lambda)$, the spectral power distribution of the color stimulus. In particular, the human observer functions are assumed to converge to one set of functions in regions of saturated color and converge to a different set of functions in regions of near neutrality, with a smooth transition connecting these two regions.

The expected impact of the present invention, which has been reduced to practice, is that one would expect a good visual match between systems with different spectral characteristics using measurement based calculations in colorful regions, skin tones, and near neutral images such as black and white photos. In general, the present invention will be particularly helpful for preserving color appearance on systems that have significantly narrow band properties of RGB primaries, which is typically the case for systems with large color gamuts, RGB laser projection systems and OLED displays in particular.

Tests of this invention indicate that if one
a) assumes that the existing standards for $\bar{x}(\lambda)\bar{y}(\lambda)\bar{z}(\lambda)$ (which are defined using the saturation method) are indeed valid for saturated colors;
b) determines corrections for ensuring a good match in near neutral regions of color;
c) proceeds to connect smoothly these uncorrected and corrected resulting values of XYZ as one transitions from saturated to neutral regions of color; and
one will achieve good matches of color between systems with significantly different spectral properties. This approach guarantees agreement between the saturated and Maxwell color matching experiments, and also resolves some of the remaining issues identified with virtual proofing systems.

Briefly, according to one aspect of the present invention a method for characterizing a color in terms of tristimulus values includes providing a source of a color; measuring a set of spectral values for color stimulus associated with the color using a spectral measurement device controlled by a digital processing system; calculating a first set of tristimulus values from the set of spectral value; defining a set of human observer color matching functions, the set of human observer color matching functions being functions of the tristimulus values; and determining a second set of tristimulus values from the set of spectral values using set of human observer color matching functions.

According to one aspect of the present invention a method for matching colors includes providing a first source of a first color and a second source of a second color; measuring a first set of spectral values for first color stimulus associated with the first color with a spectral measurement device controlled by a digital processing system; calculating a first set of tristimulus values from the first set of spectral values; defining a first set of human observer color matching functions, the first set of human observer color matching functions being functions of the first set of tristimulus values of the first color; calculating a first set of corrected tristimulus values from the first set of spectral values using the first set of human observer color matching functions; measuring a second set of spectral values for second color stimulus associated with the second color with a spectral measurement device controlled by a digital processing system; calculating a second set of tristimulus values from the second set of spectral values; defining a second set of human observer color matching functions, the second set of human observer color matching functions being functions of the second set of tristimulus values of the second color; calculating a second set of corrected tristimulus values from the second set of spectral values using the second set of human observer color matching functions; determining a difference between the first set of corrected tristimulus values and the second set of corrected tristimulus values; and adjusting one of the first and the second source to reduce the difference.

According to one aspect of the present invention a method for matching colors includes comparing the appearance of a first white color associated with a first color imaging system and a second white color a associated with second color imaging system, wherein the tristimulus values of the first white color and second white color are similar; empirically determining a fixed correction to the tristimulus values of the second white color associated with the second color imaging system in order to achieve a visual match to the first white color of the first color imaging system; measuring a first set of spectral values for a first color associated with the first color imaging system; determining a first set of tristimulus values from the first set of spectral values; measuring a second set of spectral values for a second color associated with the second color imaging system; determining a second set of tristimulus values from the second set of spectral values; applying a correction to the tristimulus values of the second color, the correction being a function of the tristimulus values as well as a function of the fixed correction; determining a difference between the tristimulus value of the first color and the corrected tristimulus value of the second color; and adjusting the second color to reduce the difference.

According to one aspect of the present invention a method for the color response of an imaging device includes reproducing a color on the imaging device based on a set of device color coordinates; measuring spectral values for the reproduced color with a spectral measurement device controlled by a digital processing system; calculating a first set of tristimulus values from the spectral values; defining a set of human observer color matching functions, the set of human observer color matching functions being functions of the first set of tristimulus values of the reproduced color; calculating a second set of tristimulus values from the spectral values using the defined set of human observer color matching functions; and associating the reproduced device color coordinate with the second set of tristimulus values.

According to one aspect of the present invention a method for reproducing an image on an imaging device includes measuring a set of spectral data for each of a plurality of colors generated from a set of color device values with a spectral measurement device controlled by a digital processing system; determining a first set of tristimulus values corresponding to each set of spectral data; defining a set of human observer color matching functions for each set of tristimulus values, wherein the human observer color matching functions are functions of the tristimulus values; determining a second set of tristimulus values for each set of spectral data using the human observer color matching functions corresponding to the first set of tristimulus values; creating a first map from device-dependent coordinates to device-independent color coordinates derived from the above sets of color device values paired with the associated second set of tristimulus values; creating a second map from device-independent coordinates to device-dependent color coordinates based on the first map; obtaining image data comprising device-independent color coordinates; converting the image data coordinates into device color coordinates via interpolation of the second map; and reproducing the image on the color device using the device color coordinates.

According to one aspect of the present invention a color measurement device includes an aperture for obtaining light from a color sample to be measured; a plurality of sets of color filters associated with human observer functions at different regions of color space; at least one detector for measuring the intensity of filtered light; an analog to digital converter for converting voltage signals from at least one detector to digital values representative of tristimulus values associated with each of the sets of color filters; and a processor to combine the sets of tristimulus values in order to calculate a final set of tristimulus values, the combining being a function of at least one of the sets of tristimulus values.

According to one aspect of the present invention a method for measuring colors includes obtaining light via an aperture from a color sample to be measured; providing a plurality of sets of color filters associated with human observer functions at different regions of color space; obtaining signals proportional to the intensity of filtered light through the plurality of sets of color filters by means of at least one detector; using at least one analog to digital converter to convert the signals from the at least one detector to digital values representative of tristimulus values associated with each of the sets of color filters; and combining the sets of tristimulus values in order to calculate a final set of tristimulus values, the combining being a function of at least one of the sets of tristimulus values.

The invention and its objects and advantages will become more apparent in the detailed description of the preferred embodiment presented below.

DETAILED DESCRIPTION OF THE INVENTION

Figure 1:
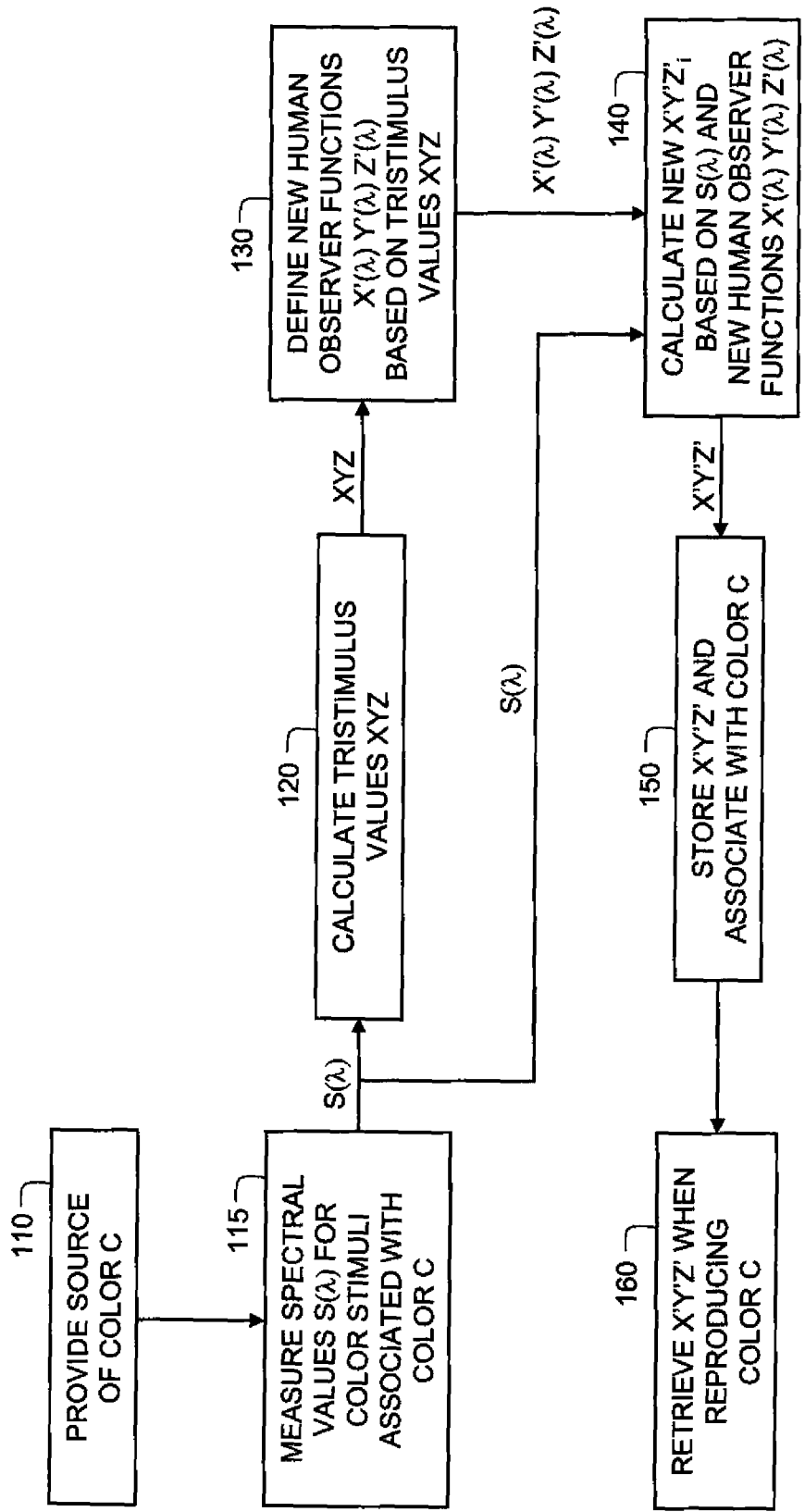
FIG. 1 shows a flowchart of a method for characterizing a color, wherein can be seen that the SPD $S(\lambda)$ of the color stimulus is used to calculate XYZ which in turn is used to create new observer functions $\bar{x}'(\lambda)\bar{y}'(\lambda)\bar{z}'(\lambda)$ These are used to recalculate new tristimulus value X'Y'Z' from the SPD $S(\lambda)$.

The human observer functions $\bar{x}(\lambda)\bar{y}(\lambda)\bar{z}(\lambda)$ are response functions used to characterize colors perceived by the human eye. The integrated sum of these functions with a color stimulus of spectral power distribution (SPD) $S(\lambda)$ results in three values, XYZ which uniquely identifies a color. Even if two colors have different SPDs, $S_1(\lambda)$ and $S_2(\lambda)$, according to color theory they will be perceived as the same color if their values of XYZ are the same.

The term used to describe the color science concept upon which the present invention is based is non-static human observer functions (NSHOF). Existing definitions of human observer functions are implicitly static with respect to the SPD $S(\lambda)$ of the color being observed. This means that the same $\bar{x}(\lambda)\bar{y}(\lambda)\bar{z}(\lambda)$ functions are used to calculate the tristimulus values XYZ regardless of the behavior of the SPD $S(\lambda)$:

$$\overrightarrow{XYZ} = \int S(\lambda)\overrightarrow{xyz}(\lambda)d\lambda \qquad (\text{Eq. 1})$$

where $S(\lambda)$ is the spectral power distribution of the stimulus on the eye.

$$\overrightarrow{xyz}(\lambda) = \begin{pmatrix} \bar{x}(\lambda) \\ \bar{y}(\lambda) \\ \bar{z}(\lambda) \end{pmatrix} \qquad (\text{Eq. 2})$$

is the vector of the human observer functions and $$\overrightarrow{XYZ} = \begin{pmatrix} X \\ Y \\ Z \end{pmatrix} \qquad (\text{Eq. 3})$$

is the vector of the calculated CIEXYZ values.

Historically the functions $\bar{x}(\lambda)\bar{y}(\lambda)\bar{z}(\lambda)$ have been modified for small areas of color (known as the 2° observer) vs. larger areas of color (known as the 10° observer). The deviant observer described by Fairchild can furthermore be adjusted for various ranges of size of color as well as modified on a per individual basis with regards to lens and macula. However, given a particular individual and size of color being observed, the dependence of $\bar{x}(\lambda)\bar{y}(\lambda)\bar{z}(\lambda)$ on $\lambda$ do not change as a function of the specific color being viewed as described by its SPD $S(\lambda)$.

If one finds that the above static functions work well for saturated colors, but finds that there is a consistent correction to $\bar{x}(\lambda)\bar{y}(\lambda)\bar{z}(\lambda)$ that is necessary for colors in near-neutral regions, a reasonable conclusion can be that human observer functions change as a function of the SPD $S(\lambda)$ of the color being observed. If the corrections appear consistent based on color space location only (for example, neutral vs. saturated region), then it can be assumed that $\bar{x}(\lambda)\bar{y}(\lambda)\bar{z}(\lambda)$ varies as a function of the tristimulus values XYZ derived from $S(\lambda)$ which can be estimated from the conventional $\bar{x}(\lambda)\bar{y}(\lambda)\bar{z}(\lambda)$ functions. By definition, the $\bar{x}(\lambda)\bar{y}(\lambda)\bar{z}(\lambda)$ human observer functions can no longer be regarded as static with regard to location in color space XYZ.

A generalized mathematical framework for describing NSHOF assumes:

$$\overrightarrow{xyz}(\lambda) \rightarrow \overrightarrow{xyz}_c(\lambda, S(\lambda)) \rightarrow \overrightarrow{xyz}_c(\lambda, f(\overrightarrow{XYZ})) \qquad (\text{Eq. 4})$$

In other words, the corrected color matching functions $\bar{x}_c(\lambda)\bar{y}_c(\lambda)\bar{z}_c(\lambda)$ may vary as a function of the integrated values of XYZ calculated using the standard $\bar{x}(\lambda)\bar{y}(\lambda)\bar{z}(\lambda)$ functions. If the exact properties of the generalized correction to the standard $\bar{x}(\lambda)\bar{y}(\lambda)\bar{z}(\lambda)$ functions in regions of near neutral, are not known, but one example of a specific correction between two systems is known, the above expression can be modified to correct for a specific system:

$$\overrightarrow{XYZ} \rightarrow \overrightarrow{XYZ}_c(\overrightarrow{XYZ}) \qquad (\text{Eq. 5})$$

Note that for ease of use with existing the tristimulus values XYZ and L*a*b* infrastructures, these corrections are described in terms of $XYZ_C$ and $\bar{x}_c(\lambda)\bar{y}_c(\lambda)\bar{z}_c(\lambda)$. However, since the human observer functions are linear transforms of the cone sensitivities $\bar{l}(\lambda)\bar{m}(\lambda)\bar{s}(\lambda)$, this mathematical description can be performed just as well in "LMS" space, or any other three component visual color space which is based upon the original color matching functions $\bar{r}(\lambda)\bar{g}(\lambda)\bar{b}(\lambda)$. Document CIE 15:2004 Appendix B contains a good description of $\bar{x}(\lambda)\bar{y}(\lambda)\bar{z}(\lambda)$ as they relate to $\bar{r}(\lambda)\bar{g}(\lambda)\bar{b}(\lambda)$. Hunt's "The Reproduction of Color" Chapter 31 contains a good description of the cone sensitivities $\bar{l}(\lambda)\bar{m}(\lambda)\bar{s}(\lambda)$ (which he prefers to call $\bar{\rho}(\lambda)\bar{\gamma}(\lambda)\bar{\beta}(\lambda)$) as they relate to $\bar{x}(\lambda)\bar{y}(\lambda)\bar{z}(\lambda)$. The approach remains the same, which is to define sensitivity functions that pertain to the saturation method of color matching and modified functions that pertain to the Maxwell method of color matching. The tristimulus values are then calculated from at least one of the two functions and are used to calculate the combining of the two extreme cases. In the case of correcting the cone sensitivities, $\bar{l}(\lambda)\bar{m}(\lambda)\bar{s}(\lambda)$, the integrated LMS cone values are used for determining the corrected $\bar{l}(\lambda)\bar{m}(\lambda)\bar{s}(\lambda)$ functions in a manner very similar to the methods described herein for correcting $\bar{x}(\lambda)\bar{y}(\lambda)\bar{z}(\lambda)$ using the integrated XYZ values. It is also possible to use tristimulus values that differ from the spectral function being corrected. For example, f(XYZ) in equation 4 could also be f(RGB) where the ROB values pertain to a standard RGB space such as Adobe™ RGB 1998. Another example spare would be "EdgeRGB" described in U.S. Pat. No. 7,554,705 and shown in FIG. 5 of that issued patent.

Note that one advantage of using an RGB space as the tristimulus space for calculating corrections to $\bar{x}(\lambda)\bar{y}(\lambda)\bar{z}(\lambda)$ is that estimates of saturation vs. neutrality can be more accurate. For example, in the case of EdgeRGB, the locus in CIE space of values of R, G, or B approaching 0 (minimum) with at least one value approach 1.0 (maximum) will be very close to the locus in CIE space where the eye is viewing monochromatic light of wavelength $\lambda$, i.e. the region in CIE space of maximum gamut or maximum saturation.

Example Mathematical Approaches for Calculating NSHOF

1. Linear Combination of Two Static Sets of $\bar{x}(\lambda)\bar{y}(\lambda)\bar{z}(\lambda)$ A first example defines two sets of human observer functions, one determined using the saturation method and one defined using the Maxwell method (indicated by subscripts S and M respectively). A weighted combination of the two functions yields:

$$\overline{xyz}_C(\lambda) = \alpha(\overrightarrow{XYZ_S})\overline{xyz}_S(\lambda) + (1.0 - \alpha(\overrightarrow{XYZ_S}))\overline{xyz}_M(\lambda) \quad \text{(Eq. 6)}$$

The weighting factor $\alpha(XYZ_s)$ indicates magnitude of saturation and should approach 1 for saturated colors and approach 0 for neutral colors. Note that for most of these approaches, two integrations will need to be performed, one for calculating $XYZ_s$ followed by a second integration to calculate $XYZ_c$ from the above corrected human observer function. An example of a "reasonable" definition for $\alpha(XYZ_s)$ is:

$$\alpha(\overrightarrow{XYZ_S}) = \frac{\left| \max\left(\frac{X_S}{X_W}, \frac{Y_S}{Y_W}, \frac{Z_S}{Z_W}\right) - \min\left(\frac{X_S}{X_W}, \frac{Y_S}{Y_W}, \frac{Z_S}{Z_W}\right) \right|}{\max\left(\frac{X_S}{X_W}, \frac{Y_S}{Y_W}, \frac{Z_S}{Z_W}\right)} \quad \text{(Eq. 7)}$$

where $XYZ_W$ is the tristimulus XYZ value of the reference white such as D50.

Equation 6 above can be rewritten as:

$$\overline{xyz}_c(\lambda) = \overline{xyz}_s(\lambda) + (1 - \alpha(\overrightarrow{XYZ_s}))\Delta\overline{xyz}(\lambda) \quad \text{(Eq. 8)}$$

where $\Delta\overline{xyz}(\lambda) = \overline{xyz}_M(\lambda) - \overline{xyz}_S(\lambda)$ (Eq. 9)

2. Linear Combination of Two Sets of Integrated XYZ Results

Similarly, in the event that the color matching functions have not yet been defined, but corrections have been determined for the tristimulus values XYZ in regions of near neutral, the following XYZ-based correction are used:

$$\overrightarrow{XYZ}_C = \alpha(\overrightarrow{XYZ_S})\overrightarrow{XYZ}_S + (1.0 - \alpha(\overrightarrow{XYZ_S}))\overrightarrow{XYZ}_M \quad \text{(Eq. 10)}$$

where $\overrightarrow{XYZ}_M = \overrightarrow{XYZ}_S + (Y_S/Y_W)\Delta\overrightarrow{XYZ}_W$ (Eq. 11)

which means Equation 10 can be rewritten as:

$$\overrightarrow{XYZ}_c = \overrightarrow{XYZ}_S + (1 - \alpha(\overrightarrow{XYZ}_s))(Y_S/Y_W)\Delta\overrightarrow{XYZ}_W \quad \text{(Eq. 12)}$$

where $\Delta XYZ_W$ is the correction to the XYZ value of the maximum white output of the imaging system in the vicinity of $XYZ_W$. This correction is used in lieu of using a corrected color matching function.

3. Parameterized Definition of $\bar{x}(\lambda)\bar{y}(\lambda)\bar{z}(\lambda)$ using Non-Static Parameters Commonly-assigned copending U.S. patent application Ser. No. 12/102,238 "Improved Human Observer XYZ Functions" describes a method for parameterizing the human observer functions, and is hereby incorporated in full. For example, one can first characterize the cone responses with the following expression:

$$f_{lms}\begin{pmatrix} \lambda, \alpha_i, \lambda_i, \Delta\lambda_{i1}, \Delta\lambda_{i2}, \\ \gamma_{i1}, \gamma_{i2}, \delta_{i1}, \\ \delta_{i2}, \Delta\gamma_{i1}, \Delta\gamma_{i2} \end{pmatrix} = \alpha_i \begin{pmatrix} \delta_{i1} + (1 - \delta_{i1}) \\ e^{-(|\lambda - \lambda_i|/2\Delta\lambda_{i1})^{(\gamma_{i1} + \Delta\gamma_{i1}|\lambda - \lambda_i|)}} \end{pmatrix} \quad \text{(Eq. 13)}$$

for $\lambda < \lambda_i$ $$= \alpha_i(\delta_{i2} + (1 - \delta_{i2}))$$

$$e^{-(|\lambda - \lambda_i|/2\Delta\lambda_{i2})^{(\gamma_{i2} + \Delta\gamma_{i2}|\lambda - \lambda_i|)}}$$

for $\lambda > \lambda_i$ where lms(1) is calculated for i=0,1,2 corresponding to 1, m, s respectively. Having calculated lms(1), we can calculate xyz(1) using the inverse of the Hunt-Pointer-E stevez matrix $M_{XYZ \to LMS}$:

$$\overrightarrow{xyz}(\lambda) = M_{XYZ \to LMS}^{-1} \overrightarrow{lms}(\lambda) \quad \text{(Eq. 14)}$$

All parameters can be replaced with variable coefficients as a function of LMS:

$$\alpha_i \to \alpha_i(LMS), 1_{i1} \to 1_{i1}(LMS), \text{ etc.}$$

Using a similar approach as before, the parameters can be optimized as described in commonly-assigned copending U.S. patent application Ser. No. 12/102,238 for a set of colors generated from the saturated color matching experiments and for Maxwell color matching experiments using near neutral colors. The color matching function will now be NSHOF via the changes in the parameters, using for example, $$\alpha_i(\overrightarrow{LMS}) = \alpha(\overrightarrow{LMS})\alpha_{iS} + (1.0 - \alpha(\overrightarrow{LMS}))\alpha_{iM} \quad \text{(Eq. 15)}$$

where $$\alpha(\overrightarrow{LMS_S}) = \frac{\left|\max\left(\frac{L_S}{L_W}, \frac{M_S}{M_W}, \frac{S_S}{S_W}\right) - \min\left(\frac{L_S}{L_W}, \frac{M_S}{M_W}, \frac{S_S}{S_W}\right)\right|}{\max\left(\frac{L_S}{L_W}, \frac{M_S}{M_W}, \frac{S_S}{S_W}\right)}$$ (Eq. 16)

where $LMS_W$ is the LMS value of reference white (for example D50) converted from $XYZ_W$ using the HPE matrix above.

4. Correcting XYZ via Piecewise Linear Methods

A mathematical method known as the "triple matrix" approach for applies piecewise linear corrections in a color space that is comprised of tristimulus values XYZ or a linear transformation of XYZ. This method has been described in U.S. Patent Publication No. 2009/0153888 (Edge). The technique is a convenient tool for characterizing NSHOF because the inverse calculation from XYZ'→XYZ can be easily performed.

Three matrices $M_i$ for i=0,1,2 define the conversion of values XYZ to corrected XYZ'. The requirement for the three matrices is as follows: for the X/Y region of color (X>Z and Y>Z), the conversion of XYZ values (1,0,0), (0,1,0), and (1,1,0) must be an identity transform, and conversion of "white" (1,1,1) must result in the required white point correction to emulate the effect of using NSHOF, i.e. (1+a,1,1+b) where:

$$\alpha = \Delta X_W / X_W$$ (Eq. 17)

$$\beta = \Delta Z_W / Z_W$$ (Eq. 18)

Assume Y will remain unchanged since luminosity of reference white is always scaled to 100.0.

The similar requirements for regions Y/Z and Z/X imply the following matrices associated with each region:

$$M_0 = \begin{pmatrix} 1 & 0 & \alpha \\ 0 & 1 & 0 \\ 0 & 0 & 1+\beta \end{pmatrix}$$ (Eq. 19)

$$M_1 = \begin{pmatrix} 1 & \alpha & 0 \\ 0 & 1 & 0 \\ 0 & \beta & 1 \end{pmatrix}$$ (Eq. 20)

$$M_2 = \begin{pmatrix} 1+\alpha & 0 & 0 \\ 0 & 1 & 0 \\ \beta & 0 & 1 \end{pmatrix}$$ (Eq. 21)

The above requirements ensure that saturated colors will have minimal correction from standard XYZ whereas colors near white or neutral will be shifted according to the XYZ correction in vicinity of white.

Having defined the $M_i$ matrices for i=0,1,2, the corrected values of XYZ are calculated as follows:

$$\overrightarrow{XYZ'} = M_i \overrightarrow{XYZ}$$ (Eq. 22)

where i=0 for $X \geq Z$ and $Y \geq Z$ (Eq. 23)

i=1 for $Y \geq X$ and $Z \geq X$ (Eq. 24)

i=2 for $Z \geq Y$ and $X \geq Y$ (Eq. 25)

To obtain the inverse conversion, the following calculation is performed:

$$\overrightarrow{XYZ} = M_i^{-1} \overrightarrow{XYZ'}$$ (Eq. 26)

This calculation is performed for i=$i_{test}$=0,1,2. Next the following logic is applied:

if $i_{test}$=0 and $X \geq Z$ and $Y \geq Z$ then i=0 if $i_{test}$=1 and $Y \geq X$ and $Z \geq X$ then i=1 if $i_{test}$=2 and $Z \geq Y$ and $X \geq Y$ then i=2

Generally, only one of the three tests above will be true and i will have a unique value with the exception of the boundaries between regions, in which case two tests will be true and will give identical results for XYZ'→XYZ.

In a similar manner, the above can be performed in other tristimulus spaces that are linear transforms of XYZ. The above correction is valid for a device with a particular spectral characterization such as an RGB display or RGB projector.

Note that Equations 19-22 can be rewritten as:

$$\overrightarrow{XYZ'} = \overrightarrow{XYZ} + \Delta \overrightarrow{XYZ}_{Corr}(\overrightarrow{XYZ}, \Delta \overrightarrow{XYZ}_W)$$ (Eq. 27)

$$\Delta \overrightarrow{XYZ}_{Corr}(\overrightarrow{XYZ}, \Delta \overrightarrow{XYZ}_W) = \Delta M_i (\Delta \overrightarrow{XYZ}_W) \overrightarrow{XYZ}$$ (Eq. 28)

$$\Delta M_0 = \begin{pmatrix} 0 & 0 & \alpha \\ 0 & 0 & 0 \\ 0 & 0 & \beta \end{pmatrix}$$ (Eq. 29)

$$\Delta M_1 = \begin{pmatrix} 0 & \alpha & 0 \\ 0 & 0 & 0 \\ 0 & \beta & 0 \end{pmatrix}$$ (Eq. 30)

$$M_2 = \begin{pmatrix} \alpha & 0 & 0 \\ 0 & 0 & 0 \\ \beta & 0 & 0 \end{pmatrix}$$ (Eq. 31)

Note that $\alpha$ and $\beta$ are functions of $\Delta XYZ_W$.

Example embodiments of the present invention are given below:

EXAMPLE 1

Method for Characterizing a Color in Terms of Tristimulus Values

The first example with a color measurement and characterization method indicated is shown in FIG. 1. Step 110 indicates that a source of color C is provided, which is measured and characterized. This color may be a reflective material viewed in an illumination system, a region of color rendered on a display, or a region of color projected with a digital projector. The spectral power distribution S(λ) of the color stimulus is measured at step 115 with a spectral measurement device such as a spectrophotometer controlled by a processing system.

For emissive devices, an emissive spectrophotometer is used to measure S(λ) directly. In the case of reflective material in a lightbox, it is possible to measure S(λ) directly. However, it is more common for the spectrophotometer to illuminate the reflective material with a know built-in illumination, infer from the measurement the reflectance spectrum R(λ) of the material which is then transmitted to the processing system associated with the spectrophotometer. The processing system proceeds to obtain an estimate for the stimulus $S(\lambda)$ by multiplying the reflectance spectrum $R(\lambda)$ with the SPD of the illumination in the lightbox $I(\lambda)$.

Whether directly or indirectly, the SPD $S(\lambda)$ of the stimulus is obtained in step 115. In step 120 the tristimulus values XYZ are calculated, for example using current human observer functions $\bar{x}(\lambda)\bar{y}(\lambda)\bar{z}(\lambda)$ determined from the saturation method of color matching. In step 130, the values of XYZ are used to define a new set of human observer functions $\bar{x}'(\lambda)\bar{y}'(\lambda)\bar{z}'(\lambda)$, for example using Equation 6 above.

In step 140, these revised functions $\bar{x}'(\lambda)\bar{y}'(\lambda)\bar{z}'(\lambda)$ are combined with $S(\lambda)$ to generate revised tristimulus values X'Y'Z'. These values are stored in step 150 in association with the identified color C, and can be retrieved in step 160 at a later time for the purpose of reproducing the color on a particular media. For many applications, it is desirable to convert the tristimulus values X'Y'Z' to a perceptually uniform color space such as L*a*b*.

The steps above were performed in order to correct and optimize $\bar{x}(\lambda)\bar{y}(\lambda)\bar{z}(\lambda)$ and the resulting values of XYZ. Note, however, that since the human observer functions are linear transforms of the cone sensitivities $\bar{l}(\lambda)\bar{m}(\lambda)\bar{s}(\lambda)$, this method can be performed just as well in "LMS" space, or any other three component visual color space that is based on color matching data.

EXAMPLE 2

Method for Matching Colors

Figure 2:
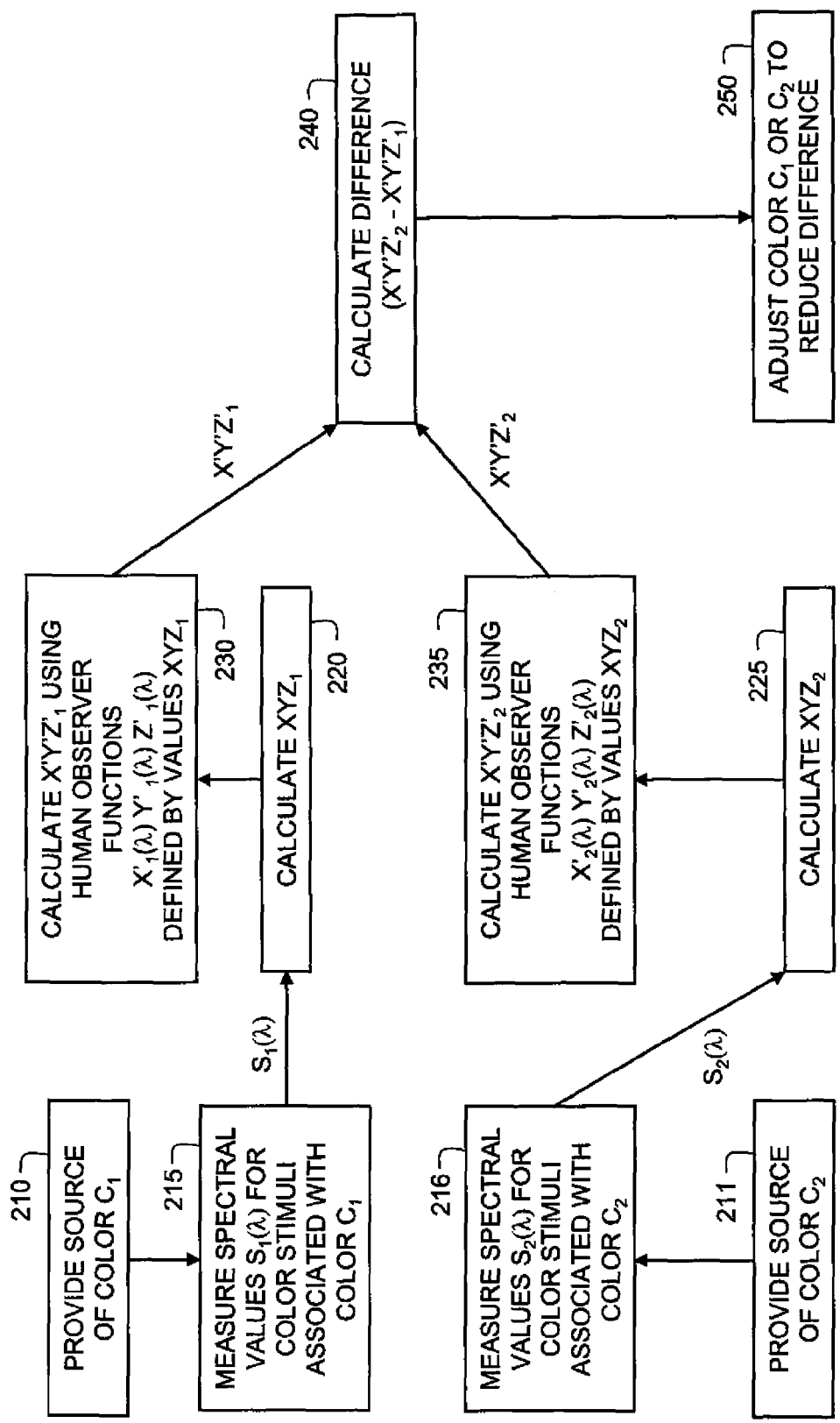
FIG. 2 shows a similar flowchart for two colors, wherein the resulting two sets of corrected tristimulus values are compared and one of the two colors are adjusted in order to improve the visual match between the colors.

The next example, describes a method for matching two colors indicated in FIG. 2. A source of color $C_1$ which is measured and characterized at step 210. This color may be a reflective material viewed in an illumination system, a region of color rendered on a display, or a region of color projected with a digital projector. In step 215, the spectral power distribution $S_1(\lambda)$ of the color stimulus is measured with a spectral measurement device such as a spectrophotometer controlled by a processing system as described in Example 1.

In step 220, the tristimulus values $XYZ_1$ are calculated, for example using current human observer functions $\bar{x}(\lambda)\bar{y}(\lambda)\bar{z}(\lambda)$ determined from the saturation method of color matching. In step 230, the values of $XYZ_1$ are used to define a new set of human observer functions $\bar{x}_1'(\lambda)\bar{y}_1'(\lambda)\bar{z}_1'(\lambda)$, for example using Equation 6 above, which are combined with $S_1(\lambda)$ to generate revised tristimulus values X'Y'Z'$_1$.

In step 211 the process is repeated with a second color $C_2$. Step 211 indicates that a source of color $C_2$ which is measured and characterized. This color may be a reflective material viewed in an illumination system, a region of color rendered on a display, or a region of color projected with a digital projector.

In step 216, the spectral power distribution $S_2(\lambda)$ of the color stimulus is measured with a spectral measurement device such as a spectrophotometer controlled by a processing system. In step 225 the tristimulus values $XYZ_2$ are calculated, for example using current human observer functions $\bar{x}(\lambda)\bar{y}(\lambda)\bar{z}(\lambda)$ determined from the saturation method of color matching. In step 235, the values of $XYZ_2$ are used to define a new set of human observer functions $\bar{x}_2'(\lambda)\bar{y}_2'(\lambda)\bar{z}_2'(\lambda)$, for example using Equation 6 above, which are combined with $S_2(\lambda)$ to generate revised tristimulus values X'Y'Z'$_2$. In step 240, the difference (X'Y'Z'$_2$−X'Y'Z'$_1$) between the colors is calculated. If the difference is larger than desired, color $C_1$ or $C_2$ can be adjusted in step 250 to reduce the difference to an acceptable level.

Examples of color adjustment are as follows: for a display, adjusting the RGB value of the pixels will alter the rendering of the color. For a digital printer, adjusting pixel values CMYK will alter the printed color. When manufacturing paper, textiles, or other reflective material, altering the dyes and pigments results in changes to color. For sources of illumination such as fluorescent tubes, adjusting the quantities of rare earth elements will affect the color of the emitted light.

The steps above were performed in order to correct and optimize $\bar{x}(\lambda)\bar{y}(\lambda)\bar{z}(\lambda)$ and the resulting values of XYZ in order to match two colors more effectively. Note, however, that since the human observer functions are linear transforms of the cone sensitivities $\bar{l}(\lambda)\bar{m}(\lambda)\bar{s}(\lambda)$, this method can be performed just as well in "LMS" space, or any other three component visual color space that is based on color matching data.

EXAMPLE 3

Method for Characterizing the Color Response of an Imaging Device

Figure 3:
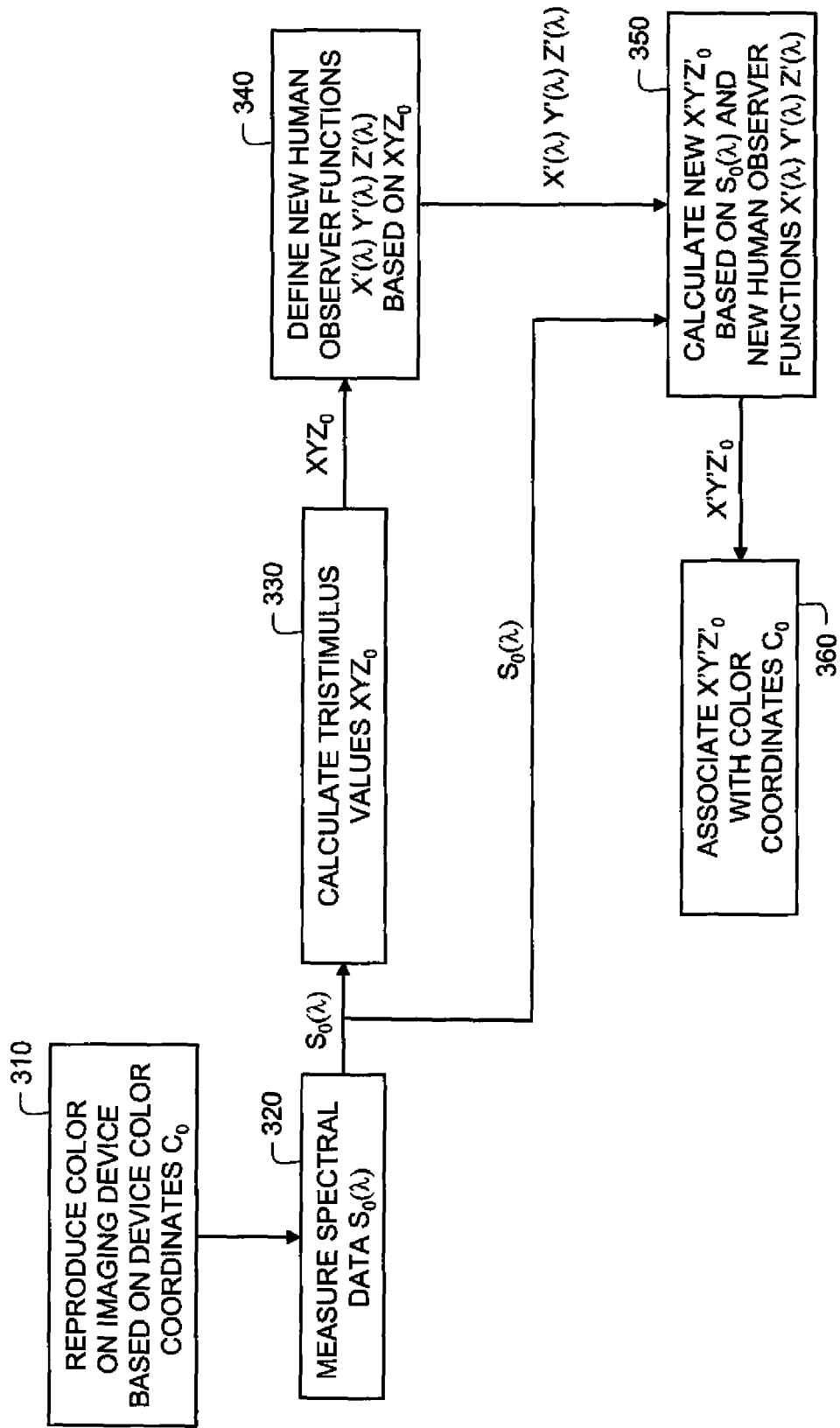
FIG. 3 shows a flowchart wherein a color association is made between device coordinates and corrected tristimulus $X'Y'Z'_O$ in order to develop a device characterization.

In step 310, FIG. 3 a color is reproduced on an imaging device based on color coordinates $C_0$. For example, the device could be a display and the color coordinates could be a specific set of RGB values, or the device could be a printer and the color coordinates of the printed color could be CMYK.

In step 320, the spectral data of the SPD $S_0(\lambda)$ of the color stimulus is measured. The measurement can be emissive or reflective as described in Example 1. In step 330 tristimulus values $XYZ_0$ are calculated using for example, observer functions $\bar{x}(\lambda)\bar{y}(\lambda)\bar{z}(\lambda)$ that were determined using the saturation method of color matching.

In step 340, the values of $XYZ_0$ are used to define a new set of human observer functions $\bar{x}'(\lambda)\bar{y}'(\lambda)\bar{z}'(\lambda)$, for example using Equation 6 above. In step 350, revised tristimulus values X'Y'Z'$_0$ are calculated based on the spectral data $S_0(\lambda)$ and $\bar{x}'(\lambda)\bar{y}'(\lambda)\bar{z}'(\lambda)$.

In step 360, X'Y'Z'$_0$ are associated with color coordinates $C_0$. This process is repeat for a sequence of colors until an adequate list of color coordinates and corresponding corrected tristimulus data is acquired. This list is then used to determine the color response of the device using methods that are well known in the art. The color response is most commonly characterized in the form of a color map or color table which indicates the conversion of device coordinates to predicted tristimulus values.

For many devices such as printers, it is preferable to convert the tristimulus values X'Y'Z' to a perceptually uniform color space such as CIELAB prior to generating the characterization or map. In color management literature and specifications, the XYZ or L*a*b* values are referred to as "device independent color" values, whereas the device color coordinates are referred to as "device dependent color values."

The steps above were performed in order to correct and optimize $\bar{x}(\lambda)\bar{y}(\lambda)\bar{z}(\lambda)$ and the resulting values of XYZ in order to characterize a color imaging device more effectively. Note, however, that since the human observer functions are linear transforms of the cone sensitivities $\bar{l}(\lambda)\bar{m}(\lambda)\bar{s}(\lambda)$, this method can be performed just as well in "LMS" space, or any other three component visual color space that is based on color matching data.

EXAMPLE 4

Method for Reproducing an Image on an Imaging Device

Figure 4:
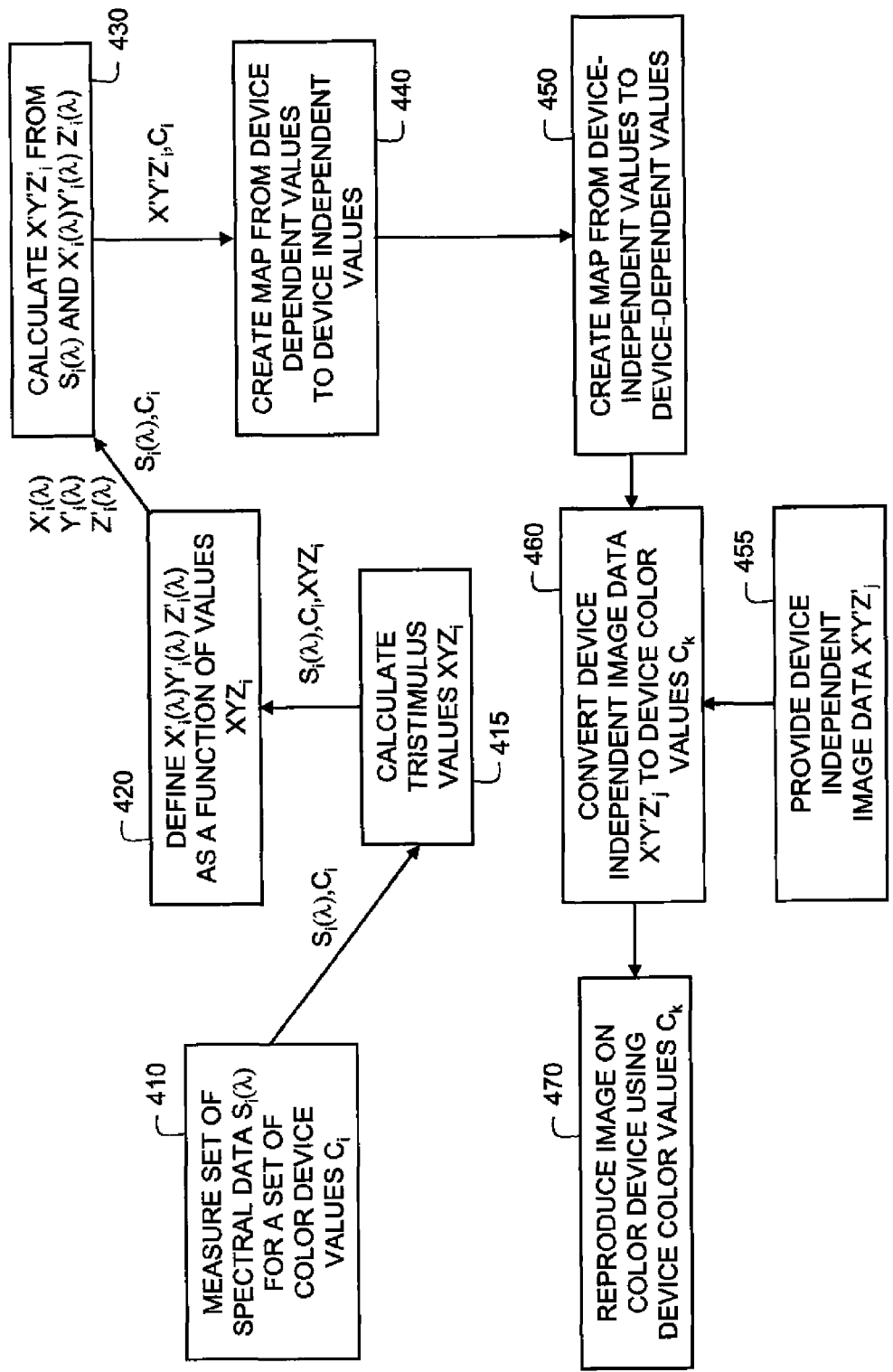
FIG. 4 shows a similar flowchart wherein a device characterization is created and then used to create an inverse map in order to convert device independent image data to output color coordinates for the purpose of reproducing the image on the device.

In step 410, FIG. 4, a set of spectral data $S_i(\lambda)$ associated with a set of color device values $C_i$ is measured. In step 415, a first set of tristimulus values $XYZ_i$ is calculated from the spectral data $S_i(\lambda)$ using for example existing color matching functions $\bar{x}(\lambda)\bar{y}(\lambda)\bar{z}(\lambda)$ based on the saturation method of color matching.

In step 420, the values of $XYZ_i$ are used to define a new set of human observer functions $\bar{x}_i^1(\lambda)\bar{y}_i^1(\lambda)\bar{z}_i^1(\lambda)$, for example using Equation 6 above. In step 430, revised tristimulus values $X'Y'Z'_i$ are calculated based on the spectral data $S_i(\lambda)$ and $\bar{x}_i^1(\lambda)\bar{y}_i^1(\lambda)\bar{z}_i^1(\lambda)$.

In step 440, a map from the device dependent values to device independent values using the list of color values $C_j$ is created and corrected tristimulus values $X'Y'Z'_i$. This step is typically accomplished via interpolation between the list of data points or by creating a mathematical model of the device based on the data.

In step 450, an inverse map is created from device independent coordinates to device dependent coordinates. This is typically performed either by inversion of the model created in step 440 or by iterative search methods that find the desired values of device dependent coordinates that map to the desired device independent coordinates when converted via the forward map created in step 440.

In step 455, in image comprising of device independent data $X'Y'Z'_j$ is provided to step 460. In step 460, the device independent data is converted to devices coordinates $C_k$ via the inverse map created in step 450. In step 470, the device coordinates $C_k$ are used to create an image on the output device that has been characterized in this process. Note that for many devices such as printers, it is preferable to convert the tristimulus values $X'Y'Z'_i$ to a perceptually uniform color space such as CIELAB prior to generating the characterization or map.

The steps above were performed in order to correct and optimize $\bar{x}(\lambda)\bar{y}(\lambda)\bar{z}(\lambda)$ and the resulting values of XYZ in order to reproduce color on an imaging device more effectively. Note, however, that since the human observer functions are linear transforms of the cone sensitivities $\bar{l}(\lambda)\bar{m}(\lambda)\bar{s}(\lambda)$, this mathematical description can be performed just as well in "LMS" space, or any other three component visual color space.

EXAMPLE 5

Color Measurement Device and Digital Camera

Colorimeters approximate the sensitivity of the eye by means of filters that approximate $\bar{x}(\lambda)\bar{y}(\lambda)\bar{z}(\lambda)$ spectral curves. Since the NSHOF require more than one set of static curves, colorimeters can approximate NSHOF by using two sets of filters, one optimized for the standard human observer functions based on the saturation and one set optimized using the Maxwell method. The former can be used to estimate the tristimulus values $XYZ_s$ and the latter for $XYZ_M$ allowing the calculation for $XYZ_c$ using Equations 8 and 9 above.

Likewise, cameras can utilize similar pairs of XYZ filter sets in order to capture pixel data for both $XYZ_s$ and $XYZ_M$ in order to calculate and store raw $XYZ_c$ data or convert the raw $XYZ_c$ data to a standard color space such as AdobeRGB™.

Figure 5:
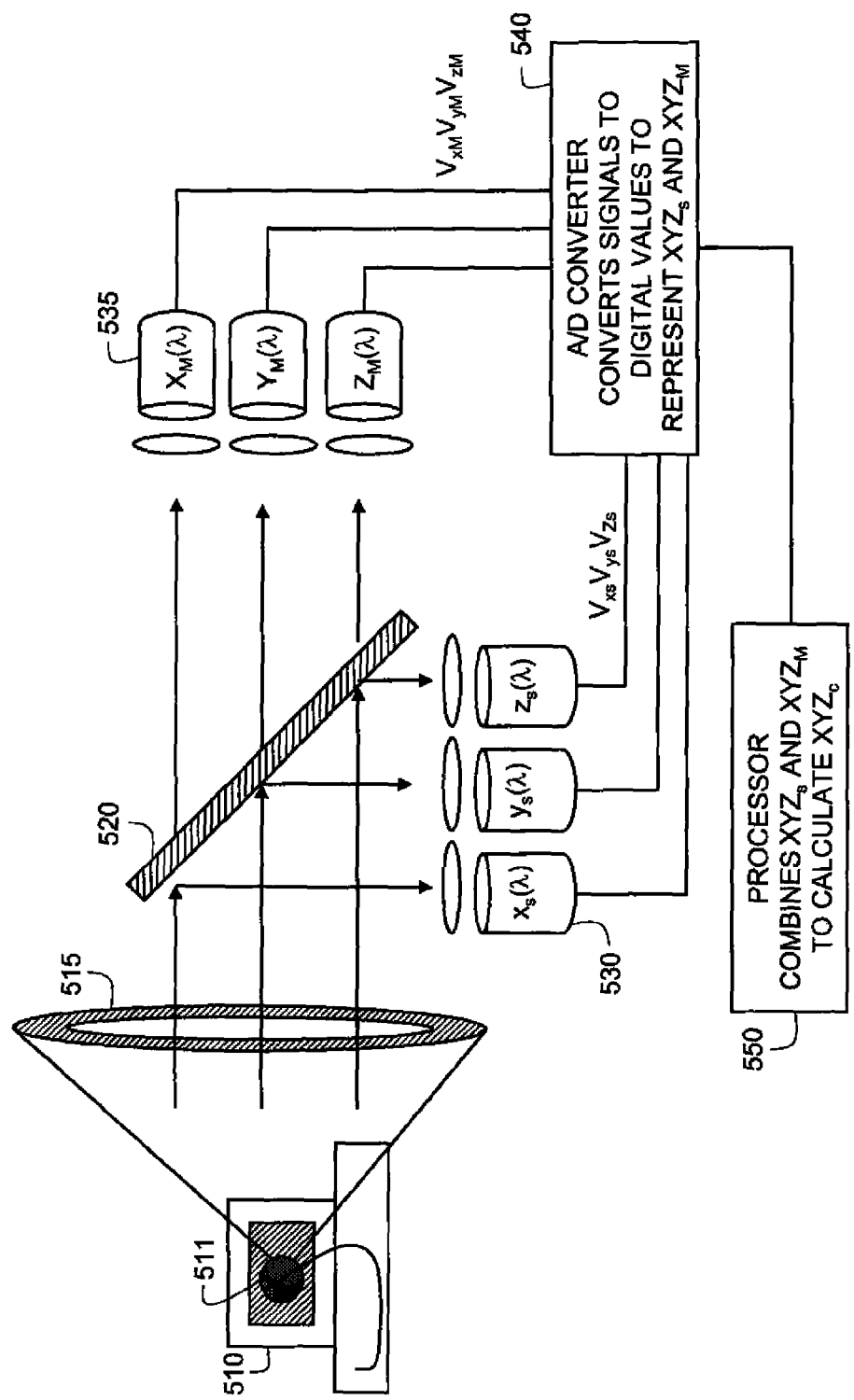
FIG. 5 shows a diagram for a calorimeter wherein two sets of filters, which pertain to the color matching functions derived from the saturation method and the Maxwell method respectively, are used to create the new corrected values of $XYZ_C$.

FIG. 5 is a diagram of an improved calorimeter. Light stimulus emitted by computer display device 510 is measured via colorimetric measurement device 511. The remaining diagram indicates a magnified version of the construction of the measurement device. Color stimulus light passes through aperture 515 and strikes beamsplitter 520. Fifty percent of the light is transmitted to detector/filter combinations 530 corresponding to human observer functions $\bar{x}_s(\lambda)\bar{y}_s(\lambda)\bar{z}_s(\lambda)$ derived from color matching experiments using the saturation method. The other fifty percent of the light is reflected by the beamsplitter to detector/filter combinations 535 corresponding to human observer functions $\bar{x}_M(\lambda)\bar{y}_M(\lambda)\bar{z}_M(\lambda)$ derived from color matching experiments using the Maxwell method of matching whites.

Voltages $V_{xs}V_{ys}V_{zs}$ from detector/filters 530 and voltages $V_{xM}V_{yM}V_{zM}$ from detector/filters 535 are converted by analog to digital converter 540 to digital values $XYZ_s$ and $XYZ_M$ that are indicative of the tristimulus values associated with $\bar{x}_s(\lambda)\bar{y}_s(\lambda)\bar{z}_s(\lambda)$ and $\bar{x}_M(\lambda)\bar{y}_M(\lambda)\bar{z}_M(\lambda)$. These digital values are combined by processor 550 to result in corrected digital values $XYZ_c$ for example using Equations 7 and 10 above.

The device above contains filters optimized to simulate $\bar{x}(\lambda)\bar{y}(\lambda)\bar{z}(\lambda)$ based on the saturation method of matching and $\bar{x}(\lambda)\bar{y}(\lambda)\bar{z}(\lambda)$ based on the Maxwell method of matching. Note, however, that since the human observer functions are linear transforms of the cone sensitivities $\bar{l}(\lambda)\bar{m}(\lambda)\bar{s}(\lambda)$, the filters could also be optimized to simulate $\bar{l}(\lambda)\bar{m}(\lambda)\bar{s}(\lambda)$ based on the saturation and Maxwell methods. The advantage of designing such as system is that in general, three filters to simulate each set of $\bar{l}(\lambda)\bar{m}(\lambda)\bar{s}(\lambda)$ should be adequate. By comparison, at least four filters are generally required to simulate each set of $\bar{x}(\lambda)\bar{y}(\lambda)\bar{z}(\lambda)$ functions.

EXAMPLE 6

Method for Measuring Colors with Colorimetric Filters

Figure 6:
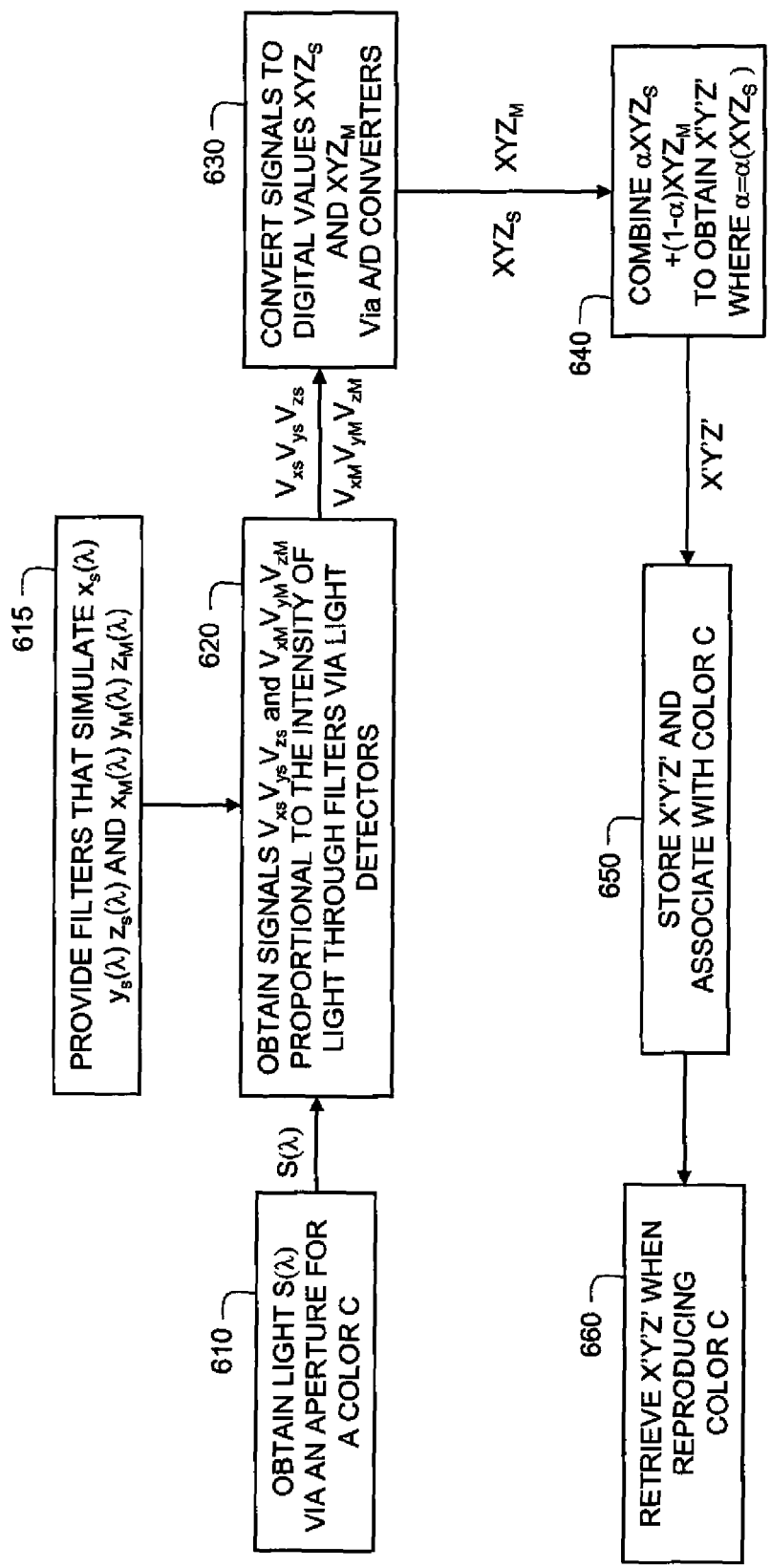
FIG. 6 is a flowchart showing the same concept as above but in the form of a process. Voltages are obtained from light detectors behind filters that resemble two sets of color matching functions. An A/D converts these signals to digital values and the values are combined to create the corrected X'Y'Z'.

In step 610, FIG. 6, light characterized are obtained by SPD $S(\lambda)$ pertaining to color C via an aperture. In step 615, filters that simulate $\bar{x}_s(\lambda)\bar{y}_s(\lambda)\bar{z}_s(\lambda)$ and $\bar{x}_M(\lambda)\bar{y}_M(\lambda)\bar{z}_M(\lambda)$ which are placed in front of light detectors for obtaining signals proportional to the intensity of light are provided. In step 620, voltages $V_{xs}V_{ys}V_{zs}$ and voltages $V_{xM}V_{yM}V_{zM}$ are obtained from detectors placed behind the filters provided in step 615. In step 630, these voltages are converted by analog to digital converters to digital values $XYZ_s$ and $XYZ_M$ that are indicative of the tristimulus values associated with $\bar{x}_s(\lambda)\bar{y}_s(\lambda)\bar{z}_s(\lambda)$ and $\bar{x}_M(\lambda)\bar{y}_M(\lambda)\bar{z}_M(\lambda)$.

In step 640, these digital values are combined by a processor to result in corrected digital values X'Y'Z' for example using Equations 7 and 10 above. In step 650, the values X'Y'Z' are stored and associated with color C. In step 660, the corrected values X'Y'Z' are retrieved when reproducing color C on a different device.

The method above utilizes filters optimized to simulate $\bar{x}(\lambda)\bar{y}(\lambda)\bar{z}(\lambda)$ based on the saturation method of matching and $\bar{x}(\lambda)\bar{y}(\lambda)\bar{z}(\lambda)$ based on the Maxwell method of matching. Note, however, that since the human observer functions are linear transforms of the cone sensitivities $\bar{l}(\lambda)\bar{m}(\lambda)\bar{s}(\lambda)$, the filters could also be optimized to simulate $\bar{l}(\lambda)\bar{m}(\lambda)\bar{s}(\lambda)$ based on the saturation and Maxwell methods. The advantage of designing such as system is that in general, three filters to simulate each set of $\bar{l}(\lambda)\bar{m}(\lambda)\bar{s}(\lambda)$ should be adequate. By comparison, at least four filters are generally required to simulate each set of $\bar{x}(\lambda)\bar{y}(\lambda)\bar{z}(\lambda)$ functions.

EXAMPLE 7

Method for Matching Colors between Two Systems

This example, describes a method for matching two colors between two systems wherein the human observer function for the Maxwell method has not been determined. Assume that the standard observer functions which are based on the saturation method of matching are known, and assume that both systems can be used to render a white color for empirically obtaining a white correction in units of XYZ.

For example, one system could be a lightbox with a neutral white paper presented for viewing, while the second system could be a display which is rendering a simulation of that paper via color management. Assume as well that the display is adjusted with regard to the white in order to ensure that the calculated values of tristimulus XYZ from the measured $S(\lambda)$ from the white of each system are very similar. Also assume that the white on the display can be adjusted in the event that there is a visual mismatch between the whites of the two systems, and that the measured difference in XYZ can be obtained after the two whites have been confirmed to match visually.

Figure 7:
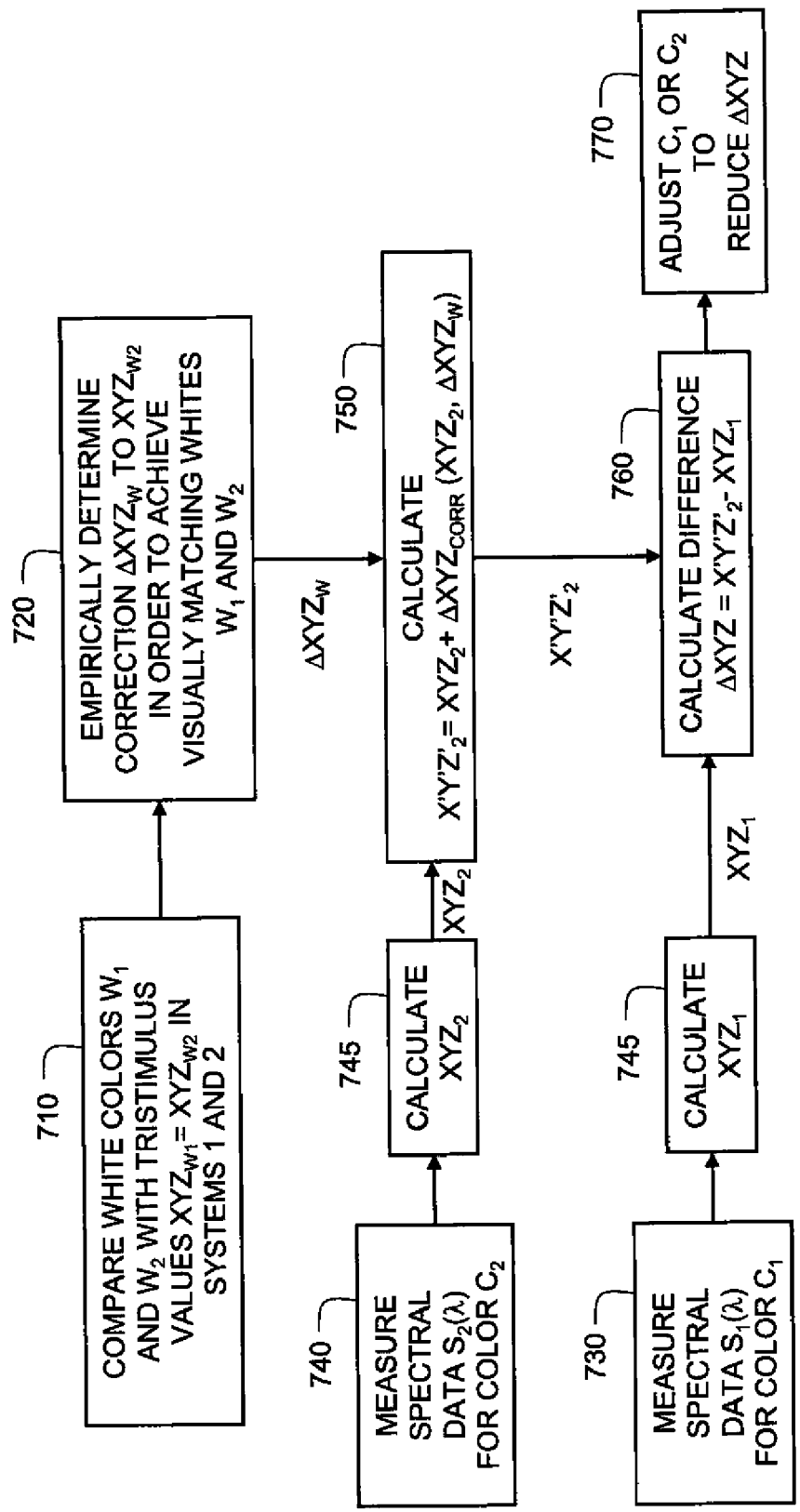
FIG. 7 shows a second method for matching colors between two systems based on the correction to XYZ required between two systems in the region of white. Standard XYZ calculations of the second system are corrected as a function of original tristimulus value $XYZ_2$ and white correction $\Delta XYZ_W$.

Step 710, FIG. 7, wherein the two whites of the two systems is compared and confirm via measurement that $XYZ_{W1}=XYZ_{W2}$ for System 1 and System 2 using the conventional saturation-based observer functions. In step 720, the white in System 2 is adjusted until the whites of the two systems match and measure the difference in XYZ between the two whites, $\Delta XYZ_W$.

In steps 730 and 740, spectral data $S_1(\lambda)$ for color $C_1$ of System 1 and spectral data $S_2(\lambda)$ for color $C_2$ of System 2 is measured. In steps 735 and 745, tristimulus values $XYZ_1$ and $XYZ_2$ is calculated. In step 750, calculate corrected values $$X'Y'Z'_2 = XYZ_2 + \Delta XYZ_{corr}(XYZ_2, \Delta XYZ_W) \quad \text{(Eq. 32)}$$

wherein the correction $\Delta XYZ_{corr}$ is a function of the tristimulus values of the second color ($XYZ_2$) and the tristimulus values of the white correction, $\Delta XYZ_W$, determined in step 720. This calculation is based on Equation 27 above.

In step 760, the difference $\Delta XYZ$ between $X'Y'Z'_2$ and $XYZ_1$ is determined. If the difference exceeds a predetermined threshold of acceptability, colors $C_1$ or $C_2$ can be adjusted in step 770 to reduce the difference. In the example of colors viewed in a lightbox compared to colors rendered on a display, it is far easier to adjust the colors on the display to reduce the magnitude of $\Delta XYZ$.

The steps above were performed in order to correct and optimize XYZ in order to improve color matching for a particular pair of systems. Note, however, that since the tristimulus values XYZ are linear transforms of the cone LMS values, this mathematical description can be performed just as well in "LMS" space, or any other three component visual color space whose tristimulus values are derived from color matching data.

One option for ease of continuity with existing color management systems is to use current systems as the starting point using current tristimulus XYZ values and profiles and then applying calculated corrections to standard values on a per device or device plus illumination basis. This approach has been implemented as follows. Piecewise linear correction similar to that described above was applied to an AdobeRGB linear color space. The value of $\Delta XYZ_W$ was calculated from the value of $\Delta Lab$ for each combination of display and lighting system. An initial display was used as a starting point. A correction of $\Delta a^*$ and $\Delta b^*$ was determined visually for the display in order to match the white/gray appearance of black and white images. A unique pair of $\Delta a^*$ and $\Delta b^*$ values was determined for that display for each type of illumination. In particular, unique corrections for GTI D50 lighting and Just-Normlicht D50 lighting were determined. Since the normalized value of $L^*a^*b^*$ for D50 illumination or white point is $L^*a^*b^* = (100,0,0)$, the values of $\Delta a^*$ and $\Delta b^*$ were added to this "perfect white" in order to calculate an adjusted white (100, $\Delta a^*$, $\Delta b^*$). The values of (100, $\Delta a^*$, $\Delta b^*$) and (100,0,0) were converted to XYZ and the difference of the result defined the values of $\Delta XYZ_W$ for use in the piecewise method described above.

Next, new monitors were added to the system. For each monitor, values ($\Delta a^*_m$, $\Delta b^*_m$) were determined to address differences between monitors due to NSHOF effects. These corrections were added to create a new corrected white value (100, $\Delta a^* + \Delta a^*_m$, $\Delta b^* + \Delta b^*_m$) in order to calculate the unique values of $\Delta XYZ_W$ for each display+illumination combination in the system. All the above corrections were obtained visually by adjusting the display until black and white images on the display demonstrated similar white/gray balance to corresponding black and white digital prints placed in the illumination system.

Applying and/or Embedding NSHOF in Displays and Projection Systems

In order to apply NSHOF to displays and projectors, a source image with associated profile (either a device profile or standard color space such as AdobeRGB™) is converted to PCS in which the PCS is calculated using one of the NSHOF methods above from spectral data or modified calorimeter. The image data is then converted from the PCS to the destination RGB system by means of a profile associated with the display or projection system calculated using PCS values determined using NSHOF.

Alternatively, the conversion from RGB to PCS to RGB can be embedded within the imaging system. Thus, a standard RGB space can be used for digital images. The standard RGB space is then assumed within the display system and the conversion from standard RGB to output RGB performed internally. If the NSHOF are used as the means for defining the PCS within the imaging device, such conversion would be equivalent to performing it within a color management system.

Certifying Illumination Sources with NSHOF

Illumination sources such as professional D50 lighting for the graphic arts have several requirements:
a) Acceptable match to theoretical D50 according to XYZ calculations,
b) Acceptable absolute match of XYZ values for illuminated colored samples when calculated using the illumination and D50, and
c) Acceptable relative XYZ match between ink jet and printing ink samples which have been adjusted to produce identical XYZ values under D50.

Despite these attempts to achieve similarity between different manufactured D50 light sources, in practice they differ by several $\Delta E$ in white balance. This can be confirmed by adjusting a displayed image in order to match first one and then another light source from two different venders.

The above procedure for optimizing the raw combinations of rare earth elements in order to achieve the above specification can be modified to use the NSHOF in order to calculate and compare XYZ between the light source and D50. Doing so will result in a very good match between the white balance. If the corresponding difference measured and calculated in this manner is 1–2 $\Delta E$, the visual similarity will be almost identical. Based on the observations of the studies performed by Thornton, the error corrected by NSHOF for white light sources could be as large as 20 $\Delta E$ for combinations of very different sets of narrow band light sources.

Certifying Papers, Paints, Textiles with NSHOF

One of the rationales for repeating the color matching experiments (performed by Stiles and Burch) was unacceptable matching of paper whites. Since the experiment was performed using the saturation method rather than the Maxwell method, there did not appear to be confirmation from the paper industry that the new effort had succeeded. For the paper industry, a full averaged study of color matching functions using the Maxwell method is needed. This result can be combined with existing saturation based observer functions to create NSHOF that should succeed very well in matching paper whites visually when the corrected XYZ's are calculated from spectral measurements. Equations 6-9 would be effective for offering a single standard of measurement to the paper industry that would be valid for measurement of all media such as paints, textiles, etc.

The NSHOF described above should be effective for specifying and for rendering color in all industries where critical color control and reproduction is required.

The invention has been described in detail with particular reference to certain preferred embodiments thereof, but it will be understood that variations and modifications can be effected within the scope of the invention.

PARTS LIST

- 110 provide source of color C
- 115 measure spectral values $S(\lambda)$ for color stimulus associated with color C
- 120 calculate tristimulus values XYZ
- 130 define new human observer functions $x'(\lambda)y'(\lambda)z'(\lambda)$ based on tristimulus values XYZ
- 140 calculate new $X'Y'Z'_1$ based on $S(\lambda)$ and new human observer functions $x'(\lambda)y'(\lambda)z'(\lambda)$
- 150 store X'Y'Z' and associate with color C from media above
- 160 retrieve X'Y'Z' when reproducing color C from media above
- 210 provide source of color $C_1$
- 215 measure spectral values $S_1(\lambda)$ for color stimulus associated with color $C_1$
- 211 Provide source of color $C_2$
- 216 measure spectral values $S_2(\lambda)$ for color stimulus associated with color $C_2$
- 220 calculate tristimulus values $XYZ_1$
- 225 calculate tristimulus values $XYZ_2$
- 230 calculate $X'Y'Z'_1$ using human observer functions $x'_1(\lambda)y'_1(\lambda)z'_1(\lambda)$ defined by values $XYZ_1$
- 235 calculate $X'Y'Z'_2$ using human observer functions $x'_2(\lambda)y'_2(\lambda)z'_2(\lambda)$ defined by values $XYZ_2$
- 240 calculate difference $(X'Y'Z'_2 - X'Y'Z'_1)$
- 250 adjust color $C_1$ or $C_2$ to reduce difference
- 310 reproduce color on imaging device based on device color coordinates $C_0$
- 320 measure spectral data $S_0(\lambda)$
- 330 calculate tristimulus values $XYZ_0$
- 340 define new human observer functions $x'(\lambda)y'(\lambda)z'(\lambda)$ based on $XYZ_0$
- 350 calculate new $X'Y'Z'_0$ based on $S_0(\lambda)$ and new human observer functions $x'(x)y'(\lambda)z'(\lambda)$
- 360 associate $X'Y'Z'_0$ with color $C_0$
- 410 measure set of spectral data $S_i(\lambda)$ for a set of color device values $C_i$
- 415 calculate tristimulus values $XYZ_i$
- 420 define $x'_i(\lambda)y'_i(\lambda)z'_i(\lambda)$ as a function of values $XYZ_i$
- 430 calculate $X'Y'Z'_i$ from $S_i(\lambda)$ and $x'_i(\lambda)y'_i(\lambda)z'_i(\lambda)$
- 440 create map from device dependent values to device independent values
- 450 create map from device-independent values to device-dependent values
- 455 provide device independent image data $X'Y'Z'_j$
- 460 convert device independent image data $X'Y'Z'_j$ to device color values $C_k$
- 470 reproduce image on color device using device color values $C_k$
- 510 computer display device
- 511 colorimetric measurement device
- 515 light aperture
- 520 beamsplitter
- 530 filters and light detectors pertaining to $\overline{x}_s(\lambda)\overline{y}_s(\lambda)\overline{z}_s(\lambda)$
- 535 filters and light detectors pertaining to $\overline{x}_M(\lambda)\overline{y}_M(\lambda)\overline{z}_M(\lambda)$
- 540 A/D converter for converting voltages to $XYZ_s$ and $XYZ_M$
- 550 processor for combining $XYZ_s$ and $XYZ_M$ to calculate $XYZ_c$
- 610 obtain light $S(\lambda)$ via an aperture for a color C
- 615 provide filters that simulate $x_s(\lambda)y_s(\lambda)z_s(\lambda)$ and $x_M(\lambda)y_M(\lambda)z_M(\lambda)$
- 620 obtain signals $V_{xs}V_{ys}V_{zs}$ and $V_{xM}V_{yM}V_{zM}$ proportional to the intensity of light through filters via light detectors
- 630 convert signals to digital values $XYZ_S$ and $XYZ_M$ Via A/D converters
- 640 combine $\alpha XYZ_S + (1-\alpha)XYZ_M$ to obtain X'Y'Z' where $\alpha = \alpha(XYZ_S)$
- 650 store X'Y'Z' and associate with color C
- 660 retrieve X'Y'Z' when reproducing color C from media above
- 710 compare white colors $W_1$ and $W_2$ with tristimulus values $XYZ_{W1} = XYZ_{W2}$ in Systems 1 and 2
- 720 empirically determine correction $\Delta XYZ_W$ to $XYZ_{W2}$ in order to achieve visually matching whites $W_1$ and $W_2$
- 730 measure spectral data $S_1(\lambda)$ for color $C_1$
- 735 calculate $XYZ_1$
- 740 measure spectral data $S_2(\lambda)$ for color $C_2$
- 745 calculate $XYZ_2$
- 750 calculate $X'Y'Z'_2 = XYZ_2 + \Delta XYZ_{corr}(XYZ_2, \Delta XYZ_W)$
- 760 calculate difference $\Delta XYZ = X'Y'Z'_2 - XYZ_1$
- 770 adjust $C_1$ or $C_2$ to reduce $\Delta XYZ$

The invention claimed is:

1. A color measurement device comprising:
   an aperture for obtaining light from a color sample to be measured;
   a plurality of sets of color filters associated with human observer functions at different regions of color space;
   at least one detector for measuring the intensity of filtered light;
   an analog to digital converter for converting voltage signals from the at least one detector to digital values representative of tristimulus values associated with each of the sets of color filters; and
   a processor to combine the sets of tristimulus values in order to calculate a final set of tristimulus values, the combining being a function of at least one of the sets of tristimulus values.

2. A method for measuring colors with calorimetric filters comprising:
   obtaining light via an aperture from a color sample to be measured;
   providing a plurality of sets of color filters associated with human observer functions at different regions of color space;
   obtaining signals proportional to the intensity of filtered light through the plurality of sets of color filters by means of at least one detector;

using at least one analog to digital converter to convert the signals from the at least one detector to digital values representative of tristimulus values associated with each of the sets of color filters;

combining the sets of tristimulus values in order to calculate a final set of tristimulus values, the combining being a function of at least one of the sets of tristimulus values.

3. The method of claim 2, wherein the final set of tristimulus values is compared to a reference set of tristimulus values and the color is adjusted in order to reduce the difference between the final set of tristimulus values and the reference set of tristimulus values.

4. The method of claim 3, wherein the comparison is performed after converting the final set of tristimulus values and the reference set of tristimulus values to a perceptually uniform color space.

5. The method of claim 2, wherein the combining is defined according to the equation $\vec{XYZ}_c = \alpha(\vec{XYZ}_s)\vec{XYZ}_s + (1.0 - \alpha(\vec{XYZ}_s))\vec{XYZ}_M$ wherein $\vec{XYZ}_M$ denotes tristimulus values obtained from filters that simulate the Maxwell method of matching whites, $\vec{XYZ}_s$ denotes tristimulus values obtained from filters that simulate the saturation method of matching colors, $\vec{XYZ}_c$ refers to the corrected tristimulus values, and $\alpha(\vec{XYZ}_s)$ is a function of tristimulus values obtained from filters that simulate observer functions based on the saturation method of matching colors.

6. The method of claim 2, wherein the tristimulus values are the cone values LMS and the color matching functions are the cone responses $\bar{l}(\lambda)\bar{m}(\lambda)\bar{s}(\lambda)$.

* * * * *